(12) United States Patent
Reddy et al.

(10) Patent No.: US 8,896,156 B2
(45) Date of Patent: Nov. 25, 2014

(54) AUTOMATIC POWER SUPPLY SELECTION FOR DUAL MODE COMPONENT

(75) Inventors: M. Vijaya Reddy, Bangalore (IN); Abhik Giri, Bangalore (IN)

(73) Assignee: Honeywell International, Inc., Morristown, NJ (US)

( * ) Notice: Subject to any disclaimer, the term of this patent is extended or adjusted under 35 U.S.C. 154(b) by 730 days.

(21) Appl. No.: 13/012,958

(22) Filed: Jan. 25, 2011

(65) Prior Publication Data

US 2012/0187933 A1  Jul. 26, 2012

(51) Int. Cl.
  *H02J 3/00* (2006.01)
  *H02J 1/00* (2006.01)
  *G05F 5/00* (2006.01)
  *H02J 1/06* (2006.01)

(52) U.S. Cl.
  CPC .......................................... *H02J 1/06* (2013.01)
  USPC ............................................ 307/75; 323/299

(58) Field of Classification Search
  CPC ............................................................. H02J 1/06
  USPC ............................ 307/45, 75, 85, 86; 323/299
  See application file for complete search history.

(56) References Cited

U.S. PATENT DOCUMENTS

| | | | | |
|---|---|---|---|---|
| 6,404,077 B1 * | 6/2002 | Moran | | 307/87 |
| 6,603,223 B2 * | 8/2003 | Utsunomiya | | 307/154 |
| 7,414,389 B2 * | 8/2008 | Nguyen | | 324/117 H |
| 8,503,197 B2 * | 8/2013 | Hayasaki et al. | | 363/21.16 |
| 2007/0032974 A1 * | 2/2007 | Muniraju et al. | | 702/85 |
| 2009/0096437 A1 * | 4/2009 | Wei | | 323/299 |
| 2011/0083028 A1 * | 4/2011 | Jung | | 713/323 |
| 2011/0298279 A1 * | 12/2011 | Dimrco et al. | | 307/31 |
| 2012/0081086 A1 * | 4/2012 | Van Dijk et al. | | 323/273 |

* cited by examiner

*Primary Examiner* — Adi Amrany
*Assistant Examiner* — Rasem Mourad
(74) *Attorney, Agent, or Firm* — Craige Thompson; Thompson Patent Law Office (57) ABSTRACT

This disclosure is directed to techniques for automatically controlling a dual mode component of a device to operate according to a first mode or a second mode. According to these techniques, a device or circuit may include a first power supply input terminal and a dual mode component that includes a second power supply input terminal. The device or circuit further includes an automatic power supply selection module configured to compare a voltage level at the first power supply input terminal to a predetermined threshold, and based on the comparison, supply one of a first mode voltage level or a second mode voltage level to the second power supply input terminal. The first mode voltage level may cause the dual mode component to operate in a first mode, while the second mode voltage level may cause the dual mode component to operate in a second mode different than the first mode.

20 Claims, 5 Drawing Sheets

AUTOMATIC POWER SUPPLY SELECTION FOR DUAL MODE COMPONENT

TECHNICAL FIELD

The disclosure relates generally to electrical circuits and, more specifically, to electrical circuits configured to operate in at least two modes depending on a power supply level received by the electrical circuit.

BACKGROUND

Some electrical circuits are configured to operate differently depending on a power supply voltage received by the electrical circuit. For example, some magnetic Hall effect circuits, e.g., circuits configured to measure magnetic properties based on the Hall effect, may be configured to operate in a standard mode for sensing magnetic properties when a first power supply level is received by the Hall effect circuit, and in a calibration mode when a second, different power supply level is receive by the Hall effect circuit.

SUMMARY

In general, this disclosure is directed to techniques for operating a dual mode component, such as an electrical circuit, configured to operate in a first mode when a first voltage level is received by a power supply input terminal of the dual mode component, and configured to operate in a second mode when a second, different voltage level is received by the power supply input terminal of the dual mode component. According to these techniques, an automatic power supply selection module of a circuit and/or device that includes the dual mode component may be configured to, based on a voltage level received at a power supply input terminal of the circuit/device, supply a first mode supply voltage or a second mode supply voltage to the power supply input terminal of the dual mode component. As described in further detail below, the techniques described herein may improve flexibility in manufacturing a circuit/device that includes a dual mode component (e.g., a Hall effect magnetic sensor component).

For example, a device is described herein. The device includes a first power supply input terminal. The device further includes a dual mode component comprising a second power supply input terminal. The device further includes a voltage regulator coupled to the first power supply input terminal and configured to supply a first mode power supply voltage level to the second power supply input terminal of a dual mode component of the device, wherein the dual mode component is configured to operate in a first mode based on the first mode power supply voltage level. The device further includes an automatic power supply selection circuit coupled to the first power supply input terminal. The automatic power supply selection circuit is configured to compare a voltage level at the first power supply input terminal to at least one predetermined threshold, and based on the comparison, output, to the second power supply input terminal, one of the first mode power supply voltage or a second mode power supply voltage. The second mode power supply voltage is configured to cause the dual mode circuit to operate in a second mode different than the first mode.

According to another example, a device is described herein. The device includes a first power supply input terminal. The device further includes a dual mode component comprising a second power supply input terminal. The device further includes means for receiving a voltage at the first power supply input terminal and for supplying a first mode power supply voltage to the second power supply input terminal, wherein the first mode power supply voltage is configured to cause the dual mode component to operate in a first mode. The device further includes means for comparing a voltage level at the first power supply input terminal to at least one predetermined threshold. The device further includes means for outputting, based on the comparison and to the second power supply input terminal, one of the first mode power supply voltage or a second mode power supply voltage. The second mode power supply voltage is configured to cause the dual mode circuit to operate in a second mode different than the first mode.

According to another example, a method is described herein. The method includes receiving, at a first power supply input terminal, a power supply voltage. The method further includes comparing a voltage level at the first power supply input terminal to at least one predetermined threshold. The method further includes outputting, to a second power supply input terminal of a dual mode component and based on the comparison, one of a first mode power supply voltage configured to cause the dual mode component to operate in a first mode, or a second mode power supply voltage configured to cause the dual mode circuit to operate in a second mode different than the first mode.

The details of one or more examples consistent with this disclosure are set forth in the accompanying drawings and the description below. Other features, objects, and advantages of this disclosure will be apparent from the description and drawings, and from the claims.

DETAILED DESCRIPTION

Figure 1:
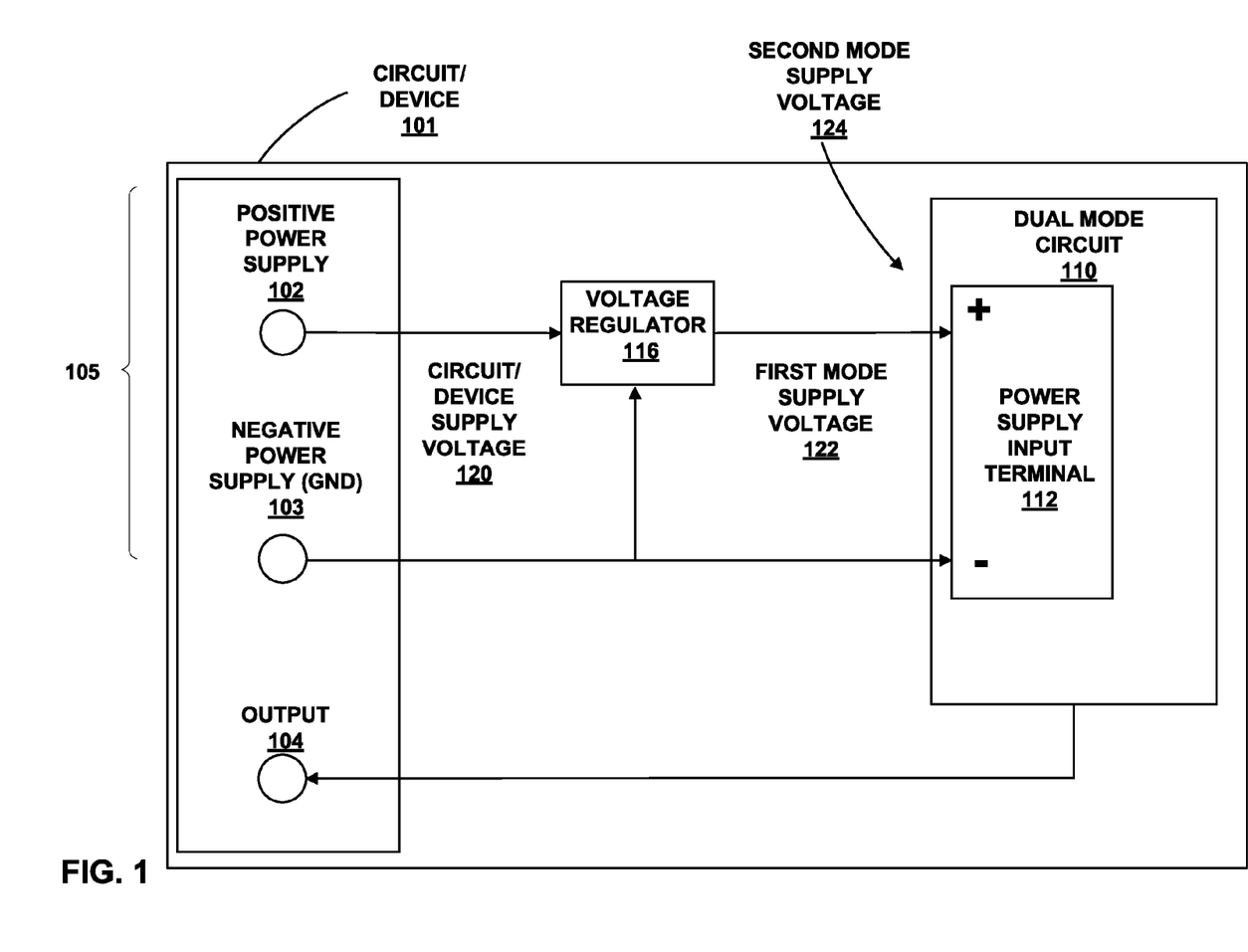
FIG. 1 is a block diagram that illustrates one example of a device/circuit that includes at least one dual mode circuit.

FIG. 1 is a block diagram that illustrates an example configuration of a device or circuit 101 that includes a dual mode component 110. In some examples, dual mode component 110 may comprise an electrical circuit, however other type of components (e.g., a component configured to process optical or other signals) is also contemplated. As shown in FIG. 1, dual mode component 110 includes a power supply input terminal 112. Dual mode component 110 may be configured to operate in at least two modes, dependent on a level of voltage (e.g., a voltage potential) supplied to component 110 via power supply input terminal 112. In one non-limiting example, dual mode component 110 may include at least one Hall effect sensor. For example, dual mode component 110 may include at least one sensor configured to measure one or more magnetic properties based on the Hall effect.

Dual mode component 110 may be configured to operate in a first mode, e.g., a standard operational mode, when a first voltage level is received at power supply input terminal 112. Dual mode component 110 may further be configured to operate in a second mode, e.g., a calibration mode, when a second voltage level is received at power supply input terminal 112. In one non-limiting example where dual mode component 110 includes at least one Hall effect sensor, dual mode circuit 110 may be operated in a standard operating mode to detect one or more magnetic properties when a first voltage level (e.g., 5 volts) is received at power supply input terminal 112. According to this example, dual mode component 110 may be operated in a calibration mode to calibrate dual mode circuit 110 for sensing one or more magnetic properties when a second voltage level (e.g., 7.8 volts) is received at power supply input terminal 112.

In some examples, dual mode component 110 may be formed as part of a larger device and/or circuit 101. For example, dual mode component 110 may be part of an integrated circuit (IC) housed within a package. In other examples, dual mode component 110 may be formed of one or more electrical circuit configured to be disposed within a housing or potting. In still other examples, dual mode circuit 110 may be formed in a larger device, such as a magnetic sensing or other device.

As also shown in FIG. 1, device/circuit 101 may also include a plurality of input/output ports 102-104. The plurality of input/output ports may include one or more pads of an integrated circuit, one or more pins of a circuit package, or any other form of accessible terminal configured to receive and/or transmit electrical signal or power energy. According to the example shown in FIG. 1, device/circuit 101 includes three ports, a positive power supply input 102, a negative power supply input 103 (e.g., ground), and a signal output 104. Positive power supply input 102 and negative power supply input may comprise a power supply input terminal 105 of device/circuit 101 configured to receive a power supply voltage 120 of circuit/device 101. Signal output 104 may be coupled to dual mode component 110 and configured to provide an output of dual mode component 110. For example, where dual mode component 110 includes a magnetic Hall effect sensor as described above, signal output 104 may be configured as a connection point to access one or more output signals of the Hall effect sensor to indicative of detected magnetic properties.

In some examples, dual mode component 110 may be configured to operate at a different power supply voltage level than circuit/device 101. As shown in FIG. 1, in some examples, device/circuit 101 may further include a voltage regulator 116. Voltage regulator circuit 116 may be configured to receive a power supply voltage 120 of circuit/device 101 via power supply input terminal 105, and convert (e.g., reduce), a level of the received power supply voltage 120 to a different voltage level, e.g, a first mode supply voltage 122 of dual mode component 110. In some examples, the first mode supply voltage 122 may comprise a voltage level at which dual mode component 110 is configured to operate in a first mode, e.g., a standard mode of operation. Where dual mode component 110 includes a Hall effect sensor as described above, the first mode supply voltage 122 may comprise a voltage level at which the Hall effect sensor is operable to sense one or more magnetic properties.

As also shown in FIG. 1, in some examples, it may be desirable to operate dual mode component 110 in a different, second operating mode. For example, the second operating mode may be a calibration mode of dual mode component 110. In particular, where dial mode component 110 includes a Hall effect sensor as described above, the Hall effect sensor may be operable to be calibrated for later sensing magnetic properties in a standard (first) mode of operation.

As described above, dual mode component 110 may operate in a second mode of operation when a second mode supply voltage 124 different than the first mode supply voltage 122 is received at power supply input terminal 112. Accordingly, as shown in FIG. 1, it may be desirable to inject a second mode supply voltage 124 at power supply input terminal 112.

According to one example, the second mode supply voltage 124 may be injected at power supply input terminal 112 by electrically coupling of an alternate power supply at a level of second mode supply voltage 124 to power supply input terminal 112. For example, a technician may manually couple a jumper cable to power supply input terminal 112. This technique may be undesirable, because it may be difficult to automate the connection of jumpers to power supply input terminal 112, thereby resulting in increased manufacturing costs. This technique may further be undesirable because, as described above, dual mode component 110 may be disposed within an outer housing/package, and or may be filled with a protective potting during manufacturing. As a result, it may be undesirable to manually connect jumpers to operate dual mode component 110 in a second mode, because it may not be possible to operated dual mode component 110 in the second mode once enclosed in a housing/packaging, or potting of device 101, which may restrict flexibility in manufacturing processes.

According to another example, second mode power supply voltage 124 may be injected by adding one or more additional ports to device/circuit 101. For example, device/circuit 124 may be modified such that it includes a second positive power supply input terminal dedicated to second supply voltage 124. The second positive power supply input terminal may be directly coupled to a positive terminal of power supply input terminal 112, and thereby bypass voltage regulator 116, which is configured to modify a received power supply voltage and output first mode supply voltage 122. According to another example, device/circuit 101 may be modified to add a control signal port. According to this example, device/circuit 101 may include a switch configured to receive a voltage at power supply input 102 and a control signal, and bypass voltage regulator 116 output such that second mode supply voltage 122 is applied to power supply input terminal 112 based on the control signal.

The examples described above may be undesirable in some cases. For example, it may desirable for many circuits/devices to provide a minimum number of input/output ports. For example, minimizing a number of input/output ports may allow device/circuit 101 to be designed smaller, or to a desired form factor. According to another example, minimizing a number of input/output ports may reduce a complexity of implementing device/circuit 101 with other devices or components, or within another device/component.

Figure 2:
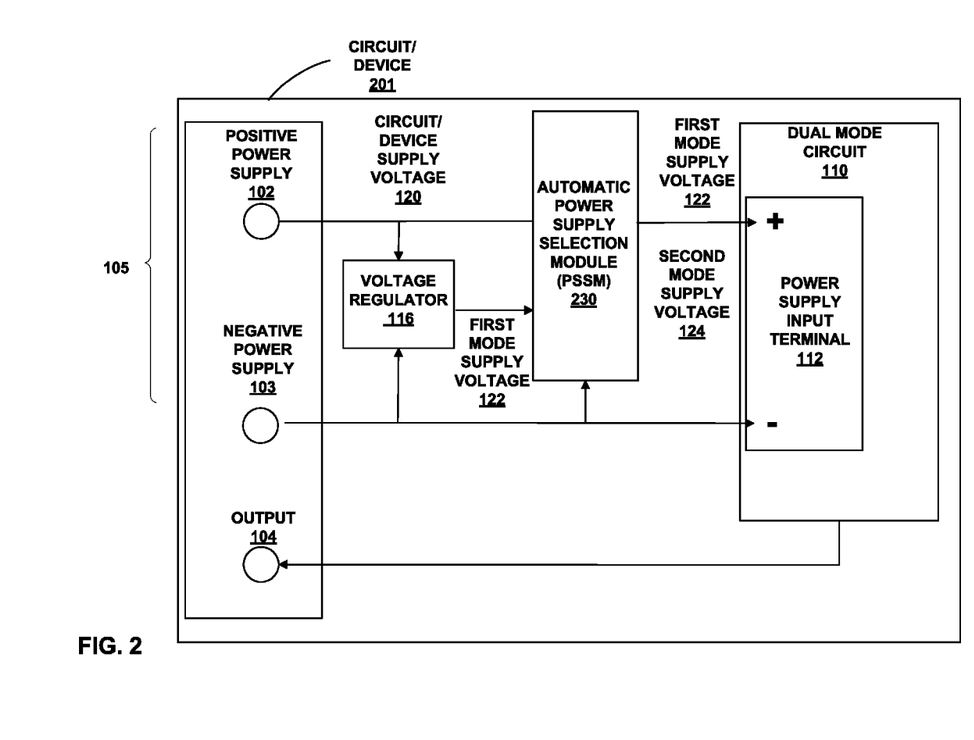
FIG. 2 is a block diagram that illustrates one example of a device/circuit that includes at least one dual mode circuit and an automatic power level selection module consistent with the techniques of this disclosure.

FIG. 2 is a block diagram that illustrates one example of a device/circuit 201 that includes a dual mode component 110 consistent with the techniques of this disclosure. The example depicted in FIG. 2 includes similar components to the example of FIG. 1. In addition, device circuit 201 includes an automatic power supply selection module 230 (hereinafter PSSM 230). PSSM 230 may be configured to automatically, based on an voltage level received at power supply input terminal 105 of device/circuit 201, output to power supply input terminal 112 of dual mode component 110 either a first mode supply voltage 122 or a second mode supply voltage 124. PSSM 230 illustrated in FIG. 2 may be advantageous, because dual mode component 110 may be operated in a second mode without manually injecting a second mode supply voltage 124 at power supply input terminal 112, and without providing an additional port of device/circuit 201 configured to operate as a control switch or alternate positive power supply terminal as described above with respect to FIG. 1. As such, dual mode component 110 of circuit/device 201 illustrated in FIG. 2 may be operated in a second mode by merely modifying a power supply voltage level applied to power supply input terminal 105, before or after dual mode component 110 and/or voltage regulator 116 are disposed within a housing, package, or potting of device circuit 201.

In some examples, PSSM 230 may divert a portion of circuit/device supply voltage 120 from voltage regulator 116, based on comparison of a voltage level of circuit/device supply voltage 120 received at power supply input terminal 105 to a predetermined threshold. For example, if circuit/device supply voltage 120 is at a first level (e.g., greater than a predetermined threshold), PSSM 230 may not operate to divert any of circuit device supply voltage 120 from voltage regulator 116, and voltage regulator 116 may operate to output a reduced voltage level, first mode supply voltage 122, to power supply input terminal 112. However, if circuit/device supply voltage 120 is at a second level different than the first level (e.g., less than a predetermined threshold), PSSM 230 may divert at least a portion of circuit/device supply voltage 120, and provide the diverted at least a portion to power supply input terminal 112 of dual mode component 110 as second mode supply voltage 124. For example, PSSM 230 may be configured to divert and/or supply circuit/device supply voltage 120 to power supply input terminal 112, if circuit/device supply voltage 120 is substantially equal to second mode supply voltage 124 (e.g., a voltage level configured to cause dual mode circuit 110 to operate in a second mode).

According to one non-limiting example, dual mode component 110 may be configured to operate in a first, standard mode of operation if a first voltage level, 5 volts, is received at power supply input terminal 112. Voltage regulator 116 may be configured to receive a voltage level of between 10 and 30 volts via power supply input terminal 105 as circuit/device supply voltage 120. To operate dual mode component 110 in the first mode, voltage regulator 116 may reduce a received circuit/device supply voltage to the first voltage level, 5 volts. According to this example, PSSM 230 may compare a voltage level of circuit/device supply voltage 120 to one or more predetermined thresholds, and if the voltage level is greater than the one or more predetermined thresholds (e.g., circuit/device supply voltage is greater than 10 volts) PSSM 230 may not divert any of device/circuit supply voltage 120. In this manner, voltage regulator 116 may supply the first mode voltage level (e.g., 5 volts) to power supply input terminal 112 of dual mode component 110.

Also according to one non-limiting example, dual mode component 110 may be configured to operate in a second mode when a second mode supply voltage 124 (e.g., substantially 7.8 volts), is received at power supply input terminal 112. According to this example, if PSSM 230 determines that a level of circuit/device supply voltage 120 less than one or more predetermined thresholds (e.g., less than 10-30 volts) is received as device/circuit power supply input terminal 105, PSSM 230 may divert at least a portion of circuit/device supply voltage 120 such that the at least a portion is supplied to power supply input terminal 112. According to one specific non-limiting example, PSSM 230 may be configured to divert and supply 7.8 volts to power supply input terminal 112, if circuit/device supply voltage 120 is substantially equal to 7.8 volts (e.g., less than 10 volts).

According to the examples described above, PSSM 230 may, based on a voltage level of device/circuit supply voltage 120 (e.g., without any control signal, switch, and/or additional port/pin of device/circuit 201) automatically supply second mode voltage level 124 to dual mode component 110, and thereby cause dual mode component 110 to be operated in a second mode. As such, device/circuit 201 may be designed with a minimized number of output ports (e.g., without a pad, pin, or other connectable structure dedicated to causing dual mode circuit 110 to be operated in a second mode). Furthermore, dual mode circuit 110 may be operated in a second mode, after dual mode circuit is enclosed within a housing, package, potting, or other structure. In addition, because PSSM 230 is configured to supply second mode power supply voltage 124 by changing a voltage level at power supply input terminal 105, operating dual mode component 110 in a second mode may not require any additional circuitry external to device/circuit 101. Instead, operating dual mode component 110 in the second mode may require supplying a different power supply voltage level to power supply input terminal 105. According to one specific example where dual mode circuit 110 includes a Hall effect magnetic sensor, the sensor may be calibrated (operated in a second mode), without additional pins on a package housing the sensor, before or after the sensor is housed within a package or other structure of circuit/device 201.

Figure 3:
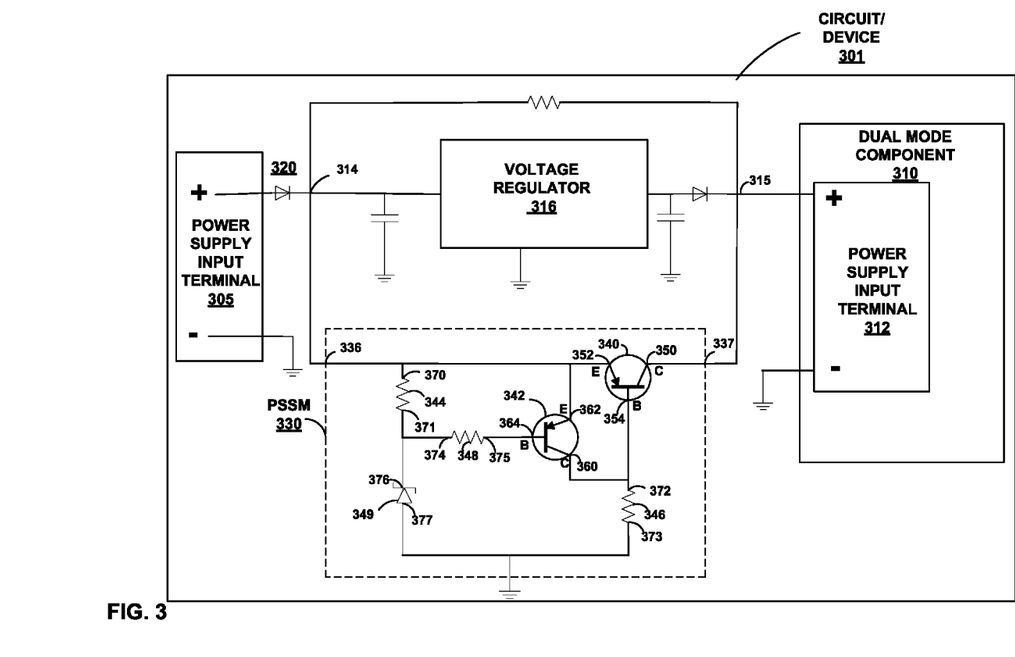
FIG. 3 is a circuit diagram that illustrates one example of a device/circuit that includes at least one dual mode circuit and an automatic power supply selection module consistent with the techniques of this disclosure.

FIG. 3 is a circuit diagram that illustrates one example of device/circuit 301 that includes a PSSM 230, PSSM 330. As depicted in FIG. 3, PSSM 330 is coupled to a voltage regulator 316. Voltage regulator 316 may comprise electrical or other circuitry configured to receive a voltage input with a DC voltage level, and generate a voltage output with a different (e.g., lower) DC voltage level. As also shown in FIG. 3, voltage regulator 316 may be coupled to a power supply input terminal 305 of a device/circuit 301 that includes a dual mode component 310. Voltage regulator 316 may be configured to receive, at input terminal 314 via power supply input terminal 305, a power supply voltage 320 of device/circuit 301, and supply, at output terminal 315 to dual mode component 310, a first mode power supply voltage. The first mode power supply voltage may be configured to cause dual mode component 310 to operate in first mode. According to one example where dual mode component 310 include a Hall effect sensor, the first mode power supply voltage may cause the Hall effect sensor to operate to detect one or more magnetic properties.

As shown in FIG. 3, PSSM 330 includes a first terminal 336 coupled to power supply input terminal 305 of device/circuit 301 (and an input terminal 314 of voltage regulator 316), and a second terminal 337 coupled to power supply input terminal 312 of dual mode component 310 (and an output terminal 315 of voltage regulator 316). In operation, PSSM 330 may, based on a voltage level at power supply input terminal 305, divert at least a portion of device/circuit power supply voltage 320, such that a second mode power supply voltage 322 is supplied to power supply input terminal 312 of dual mode component 310.

According to the example depicted in FIG. 3, PSSM 330 includes at least a first transistor 340 and a second transistor 342. In the example of FIG. 3, first and second transistors 340 and 342 are npn-type bipolar junction (BJT) type transistors. In other examples, first and second transistors 340 and 342 of PSSM 330 may instead be pnp-type BJT transistors, or one or more other types of transistors, such as metal-oxide semiconductor field effect (MOSFET) transistors, or any other type of transistor or circuit element now known or later developed.

As shown in FIG. 3, first transistor 340 includes a first terminal 350 (e.g., a collector terminal) coupled to output terminal 315 of voltage regulator 316. First transistor 340 further includes a second terminal 352 (e.g., an emitter terminal) coupled to input terminal 314 of voltage regulator 316. Second terminal 352 of first transistor 340 is also coupled to a first terminal 370 of a first resistive element 344, and a second terminal 362 (e.g., an emitter terminal) of a second transistor 342. First transistor 340 further includes a third terminal 354 (e.g., a base terminal) coupled to a first terminal 372 of a second resistive element 346 and a first terminal 360 (e.g., a collector terminal) of transistor 342. A second terminal 373 of second resistive element 346 is coupled to ground. A third terminal 364 (e.g., a base terminal) of second transistor 242 is coupled to a second terminal 375 of a third resistive element 348. A first terminal 374 of the third resistive element 348 is coupled to a second terminal 371 of first resistive element 344, and a first terminal 376 of a zener diode 349. A second terminal 377 of zener diode 349 is connected to ground.

In operation, second transistor 342 may control first transistor 340 to divert device/circuit 301 power supply voltage 320 based on comparison of device/circuit power supply voltage 320 to a predetermined threshold. For example, if device/circuit power supply voltage 320 is greater than a predetermined threshold (e.g., if a portion of device/circuit power supply 320 across zener diode 349 and a base-emitter voltage (Vbe) of second transistor 342 is great enough to cause second transistor 342 to turn on), second transistor 342 may be turned on, and thereby may control first transistor 340 to be in an off state. In this state, first transistor 340 may not operate to divert any of device/circuit power supply voltage 320. Instead, power supply voltage 320 may be supplied to voltage regulator 316, and voltage regulator 316 may operate to supply a first mode supply voltage level (e.g., first mode supply voltage 122 illustrated in FIGS. 1 and 2) to power supply input terminal 112 (e.g., via output terminal 315).

However, if a voltage level of device/circuit power supply voltage 320 is less than a predetermined threshold (e.g., if a portion of device/circuit power supply 320 across zener diode 349 and a base-emitter voltage (Vbe) of second transistor 342 is not great enough to cause second transistor 342 to turn on), second transistor 342 may be in an off state, and thereby second transistor 342 may control first transistor to be in an on state. In an on state, first transistor 342 may cause at least a portion of device/circuit power supply voltage 320 to be diverted from voltage regulator 316, and instead supplied to power supply input terminal 312 (e.g., via PSSM 330 output terminal 337) of dual mode component 310. Accordingly, PSSM 330 may be operable to control a power supply voltage level supplied to dual mode component 310, and thereby operate dual mode component 310 in first or second mode based on comparison of device/circuit power supply voltage 320 to a predetermined threshold.

As described above with respect to FIG. 2, according to one non-limiting example, to operate in a first mode, device/circuit 301 may receive at power supply input terminal 305 a voltage level of 10-30 voltage, and voltage regulator 316 may reduce the receive voltage level and supply a voltage of substantially 5 volts to dual mode component 310 as first mode power supply voltage 322. According to this example, dual mode component 310 may be configured to operate in a second mode if a power supply voltage level of substantially 7.8 volts is supplied to power supply input terminal 312.

According to this non-limiting example, if 10-30 volts are supplied at power supply input terminal 305, then a sum of a voltage across zener diode 349 and a base-emitter voltage (Vbe) of second transistor 342 may be great enough to cause second transistor 342 to turn on. However, if a voltage supplied at power supply input terminal 305 drops enough to reduce a voltage across zener diode 349 and Vbe of second transistor 342 to cause second transistor 342 to turn off, second transistor 342 may control first transistor 340 to turn on, and thereby cause a voltage supplied at power supply input terminal 305 to be diverted to power supply input terminal 312 of dual mode component 310. For example, if dual mode component 310 is configured to operate in a second mode when a voltage at power supply input terminal 312 is 7.8 volts, then if 7.8 volts are supplied to power supply input terminal 305, then substantially 7.8 volts may be supplied to power supply input terminal 312.

As described above, the example PSSM circuit 330 may be advantageous for a number of reasons. For example, dual mode component 310 may be operated in a first or a second mode, by merely changing a voltage level supplied to circuit/device power supply input terminal 305.

Figure 4:
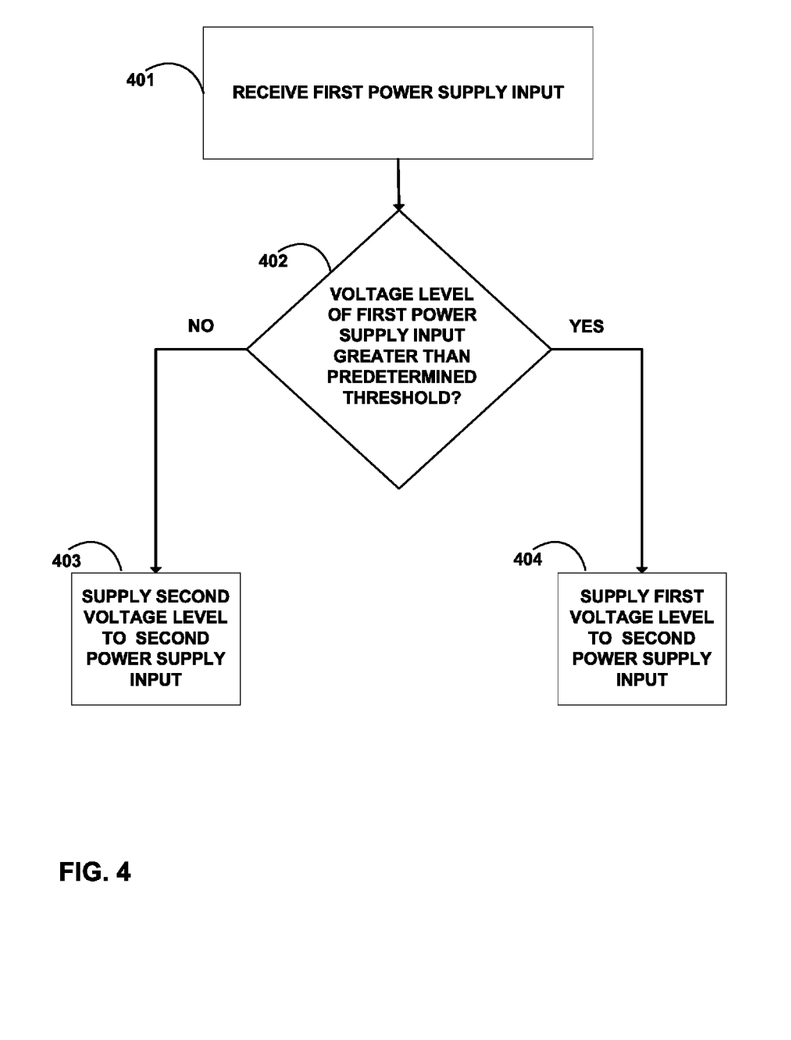
FIG. 4 is a flowchart that illustrates one example of a method consistent with the techniques of this disclosure.

FIG. 4 is a flow chart that illustrates generally one example of a method consistent with the techniques of this disclosure. As shown in FIG. 4, a PSSM module (e.g., 230, 330) of a circuit/device 201 may receive, via a first power supply input terminal (e.g., power supply input terminal 205, 305) a power supply voltage (e.g., circuit/device power supply voltage 120, 220, 320) (401).

The PSSM module 330 may compare a voltage level at the first power supply input terminal (e.g., circuit/device power supply voltage 120, 220, 320) to a predetermined threshold (402). If the first power supply input (e.g., circuit/device power supply voltage 120, 220, 320) is greater than the predetermined threshold (e.g., sufficient to cause second transistor 342 to turn on), PPM 330 may supply (e.g., via first transistor 340) a first mode voltage level (e.g., first mode supply voltage 222, via voltage regulator 216, 316) to a second power supply input 212 of a dual mode component 210. The first mode voltage level (e.g., first mode supply voltage 222) may be configured to cause dual mode component 210 to operate in a first mode.

However, if the first power supply input 305 is less than the predetermined threshold (e.g., second transistor 342 is turned off), PPM 330 may supply (e.g., via first transistor 340) a second mode voltage level (e.g., second mode voltage level 224) to the second power supply input terminal 312 of the dual mode component 310. The second mode voltage level (e.g., second mode voltage level 224) may be configured to cause the dual mode component 310 to operate in a second mode different than the first mode. According to one non-limiting example where the dual mode component 310 includes a Hall effect sensor, the first mode voltage level may cause the Hall effect sensor to operate in a first mode to detect one or more magnetic properties. Also according to this non-limiting example, the second mode voltage level may cause the Hall effect sensor to operate in a second mode to calibrate the Hall effect sensor to later detect one or more magnetic properties.

Figure 5:
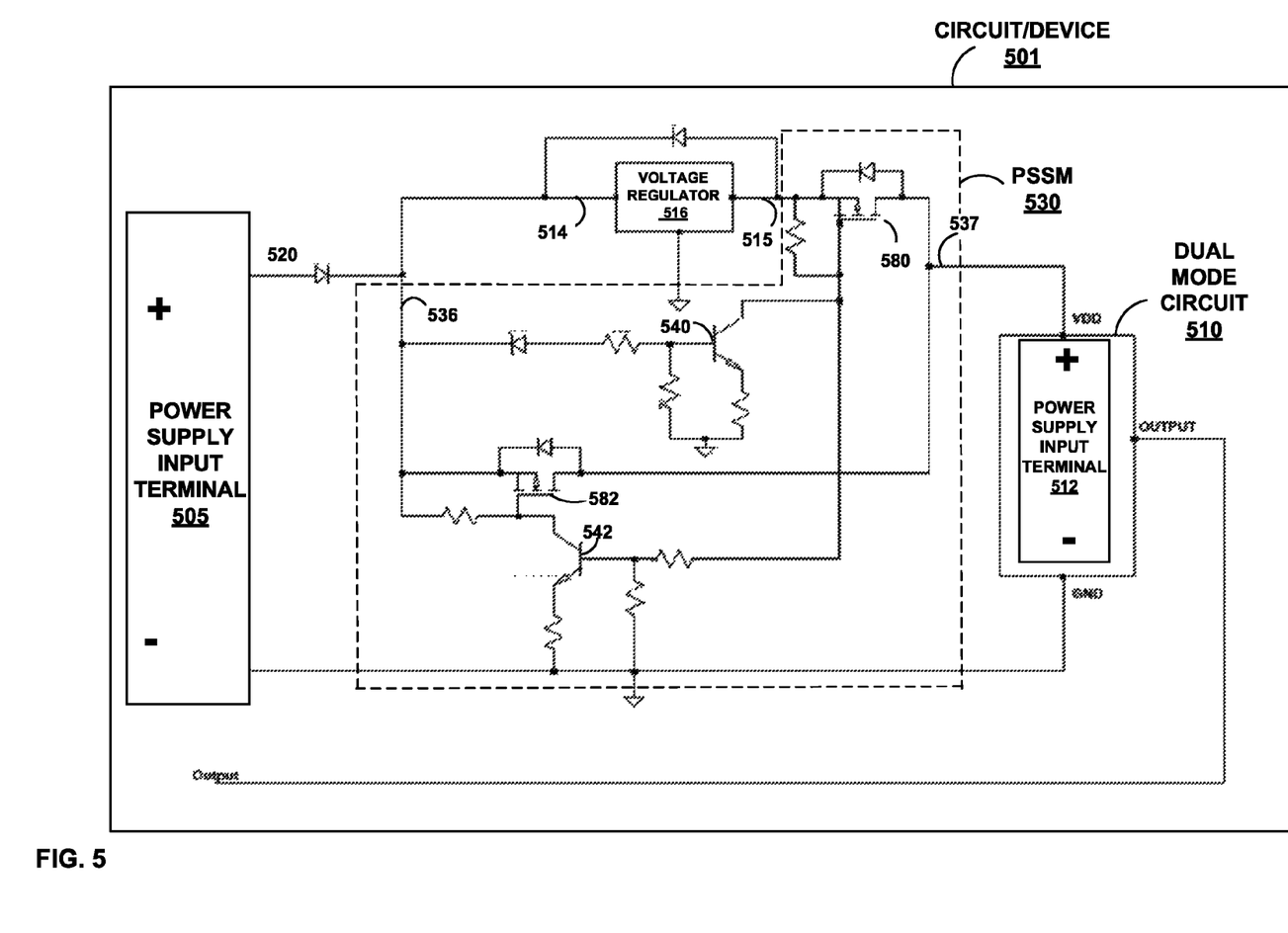
FIG. 5 is a circuit diagram that illustrates another example of a device/circuit that includes at least one dual mode circuit and an automatic power supply selection module consistent with the techniques of this disclosure.

FIG. 5 is a circuit diagram that illustrates one example of device/circuit 501 that includes a PSSM 230, PSSM 530. As depicted in FIG. 5, PSSM 530 is coupled to a voltage regulator 516. Voltage regulator 516 may comprise electrical or other circuitry configured to receive a voltage input with a DC voltage level, and generate a voltage output with a different (e.g., lower) DC voltage level. As also shown in FIG. 5, voltage regulator 516 may be coupled to a power supply input terminal 505 of a device/circuit 501 that includes a dual mode component 510. Voltage regulator 516 may be configured to receive, at input terminal 514 via power supply input terminal 505, a power supply voltage 520 of device/circuit 501, and supply, at output terminal 515 to dual mode component 510, a first mode power supply voltage. The first mode power supply voltage may be configured to cause dual mode component 510 to operate in first mode. According to one example where dual mode component 510 includes a Hall effect sensor, the first mode power supply voltage may cause the Hall effect sensor to operate to detect one or more magnetic properties.

As shown in FIG. 5, PSSM 530 includes a first terminal 536 coupled to power supply input terminal 505 of device/circuit 501 (and an input terminal 514 of voltage regulator 516), and a second terminal 537 coupled to power supply input terminal 512 of dual mode component 510 (and an output terminal 515 of voltage regulator 516). In operation, PSSM 530 may, based on a voltage level at power supply input terminal 505, divert at least a portion of device/circuit power supply voltage 520, such that a second mode power supply voltage 522 is supplied to power supply input terminal 512 of dual mode component 510.

As shown in the example of FIG. 5, PSSM 530 includes four transistors, MOSFET transistors 580, 582 and BJT transistors 540, 542. BJT transistor 540 may operate to control MOSFET transistor 580. Similarly, BJT transistor 542 may operate to control MOSFET transistor 580.

In operation, transistor 540, may control transistors 582, 580 to divert device/circuit 501 power supply voltage 520 based on comparison of device/circuit power supply voltage 520 to a predetermined threshold. For example, if device/circuit power supply voltage 520 is greater than a predetermined threshold, transistor 540 may be turned on, and thereby may control first transistor 580 to be in an on state. In this state, transistor 582 may not operate to divert any of device/circuit power supply voltage 520. Instead, power supply voltage 520 may be supplied to voltage regulator 516, and voltage regulator 516 may operate to supply a first mode supply voltage level (e.g., first mode supply voltage 122 illustrated in FIGS. 1 and 2) to power supply input terminal 512 (e.g., via output terminal 515).

However, if a voltage level of device/circuit power supply voltage 520 is less than a predetermined threshold, transistor 542 may be turned on and thereby may control transistor 582 to be in an on state. Accordingly, PSSM 530 may be operable to control a power supply voltage level supplied to dual mode circuit 510, and thereby operate dual mode component 510 in first or second mode based on comparison of device/circuit power supply voltage 520 to a predetermined threshold.

As described above with respect to FIG. 2, according to one non-limiting example, to operate in a first mode, device/circuit 501 may receive at power supply input terminal 505 a voltage level of 10-30 voltage, and voltage regulator 516 may reduce the receive voltage level and supply a voltage of substantially 5 volts to dual mode circuit 510 as first mode power supply voltage. According to this example, dual mode circuit 510 may be configured to operate in a second mode if a power supply voltage level of substantially 7.8 volts is supplied to power supply input terminal 512.

As described above, the example PSSM circuit 530 may be advantageous for a number of reasons. For example, dual mode circuit 510 may be operated in a first or a second mode, by merely changing a voltage level supplied to circuit/device power supply input terminal 505.

Various examples have been described. These and other examples are within the scope of the following claims.

The invention claimed is:

1. A device, comprising:
 a first power supply input terminal;
 a dual mode component comprising a second power supply input terminal;
 a voltage regulator coupled to the first power supply input terminal and configured to supply a first mode power supply voltage level to the second power supply input terminal of the dual mode component of the device, wherein the first mode power supply voltage is configured to cause the dual mode component to operate in a first mode;
 an automatic power supply selection circuit coupled to the first power supply input terminal and configured to:
  compare a voltage level at the first power supply input terminal to at least one predetermined threshold; and
  based on the comparison, output, to the second power supply input terminal, one of the first mode power supply voltage or a second mode power supply voltage, wherein the second mode power supply voltage is a voltage at the first power supply input terminal and is configured to cause the dual mode component to operate in a second mode different than the first mode, wherein the first mode power supply voltage is less than or equal to the voltage at the first power supply input terminal.

2. The device of claim 1, wherein the automatic power supply selection circuit is configured to supply the voltage level at the first power supply input terminal to the dual mode component as the second mode voltage level.

3. The device of claim 1, wherein the dual mode component comprises a Hall effect sensor configured to detect one or more magnetic properties.

4. The device of claim 3, wherein the first mode comprises an operation mode of the Hall effect sensor to detect one or more magnetic properties; and
 wherein the second mode comprises a calibration mode of the Hall effect sensor.

5. The device of claim 1, wherein the automatic power supply selection circuit is configured to supply an output of the at least one voltage regulator as the first voltage power supply voltage level if a voltage level at the first power supply input terminal is greater than the predetermined threshold; and
 supply a voltage level at the first power supply input terminal to the second power supply input terminal if the voltage level at the first power supply input terminal is less than the predetermined threshold.

6. The device of claim 5, wherein the automatic power supply selection circuit comprises:
 a first transistor configured to supply one of the first mode voltage level and second mode voltage level to the second power supply input terminal; and
 a second transistor configured to control the first transistor to supply one of the first mode voltage level and the second mode voltage level based on the voltage level received via the first power supply input terminal.

7. The device of claim 6, wherein the predetermined threshold comprises:
 a voltage across at least one diode of the automatic power supply selection circuit and at least one base-emitter voltage of the second transistor.

8. A device, comprising:
 a first power supply input terminal; a dual mode component comprising a second power supply input terminal;
 means for receiving a voltage at the first power supply input terminal and for supplying a first mode power supply voltage to the second power supply input terminal, wherein the first mode power supply voltage is configured to cause the dual mode component to operate in a first mode; and means for comparing a voltage level at the first power supply input terminal to at least one predetermined threshold; and means for outputting, based on the comparison to the second power supply input terminal, one of the first mode power supply voltage or a second mode power supply voltage, wherein the second mode power supply voltage is a voltage at the first power supply input terminal and is configured to cause the dual mode component to operate in a second mode different than the first mode, wherein the first mode power supply voltage is less than or equal to the voltage at the first power supply input terminal.

9. The device of claim 8, wherein the means for outputting, based on the comparison and to the second power supply input terminal, one of the first mode power supply voltage or the second mode power supply voltage output the voltage level at the first power supply input terminal as the second mode voltage level.

10. The device of claim 8, wherein the dual mode component comprises a Hall effect sensor configured to detect one or more magnetic properties.

11. The device of claim 10, wherein the first mode comprises an operation mode of the Hall effect sensor to detect one or more magnetic properties; and
wherein the second mode comprises a calibration mode of the Hall effect sensor.

12. The device of claim 8, wherein the means for outputting, based on the comparison and to the second power supply input terminal, one of the first mode power supply voltage or a second mode power output the voltage level at the first power supply input terminal to the second power supply input terminal if the voltage level of the first power supply input terminal is less than the predetermined threshold.

13. The device of claim 12, wherein the means for outputting, based on the comparison and to the second power supply input terminal, one of the first mode power supply voltage or a second mode power comprises:
a first transistor configured to supply one of the first mode voltage level and second mode voltage level to the second power supply input terminal; and
a second transistor configured to control the first transistor to supply one of the first mode voltage level and the second mode voltage level based on the comparison.

14. The device of claim 13, wherein the predetermined threshold comprises:
a voltage across at least one diode and at least one base-emitter voltage of the second transistor.

15. The device of claim 13, wherein the first and second transistors are BJT transistors, and wherein the first transistor comprises:
a collector terminal coupled to the second power supply input terminal;
an emitter terminal coupled to an emitter terminal of the second transistor, a first terminal of a first resistor element, and an output power supply terminal of the automatic power supply selection circuit; and
a gate terminal coupled to a collector terminal of the second transistor and a first terminal of a third resistor;
wherein the second transistor further comprises:
a gate terminal coupled to second terminal of a second resistor; and
wherein a second terminal of the first resistor is coupled to a first terminal of the second transistor and a first terminal of at least one diode, wherein a second terminal of the at least one diode is coupled to a ground terminal of the system; and
wherein a second terminal of the third resistor is coupled to the ground terminal of the system.

16. A method, comprising:
receiving, at a first power supply input terminal, a power supply voltage; comparing a voltage level at the first power supply input terminal to at least one predetermined threshold; and outputting, to a second power supply input terminal of a dual mode component and based on the comparison, one of a first mode power supply voltage configured to cause the dual mode component to operate in a first mode, or a second mode power supply voltage, wherein the second mode power supply voltage is a voltage at the first power supply input terminal configured to cause the dual mode component to operate in a second mode different than the first mode, wherein the first mode power supply voltage is less than or equal to the voltage at the first power supply input terminal.

17. The method of claim 16, wherein the dual mode component comprises a Hall effect sensor configured to detect one or more magnetic properties.

18. The method of claim 17, wherein the first mode comprises an operation mode of the Hall effect sensor to detect one or more magnetic properties; and
wherein the second mode comprises a calibration mode of the Hall effect sensor.

19. The method of claim 16, wherein outputting, based on the comparison and to the second power supply input terminal, one of the first mode power supply voltage or the second mode power supply voltage comprises:
if the voltage level at the first power supply input terminal is greater than the predetermined threshold, outputting the first mode power supply voltage to the second power supply input terminal; and
if the voltage level at the first power supply input terminal is less than the predetermined threshold, outputting the second mode power supply voltage to the second power supply input terminal.

20. The method of claim 16, wherein outputting, to a second power supply input terminal of a dual mode component and based on the comparison, one of the first mode power supply voltage and the second mode power supply voltage comprises outputting using a first transistor, and further comprising:
controlling, with a second transistor, the first transistor to output one of the first mode power supply voltage and the second mode power supply voltage.

* * * * *